(No Model.)
T. DOUP, Jr.
ROAD GATE.
No. 408,697. Patented Aug. 13, 1889.
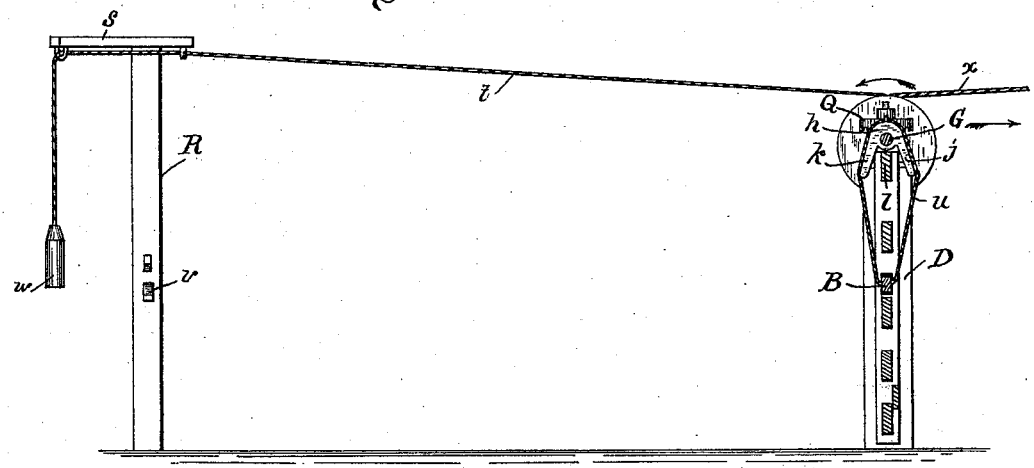
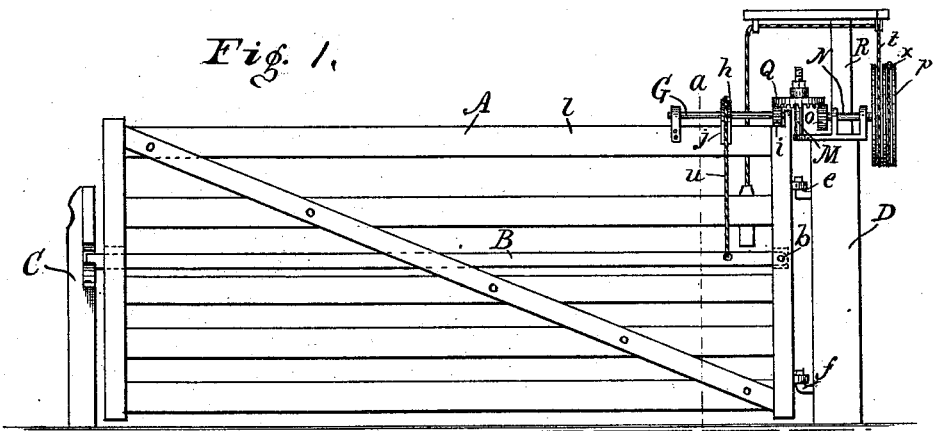
Witnesses
T. M. Hood.
C. O. Merritt.
Inventor
Thomas Doup, Jr.
By H. P. Hood,
Attorney

UNITED STATES PATENT OFFICE.

THOMAS DOUP, JR., OF COLUMBUS, INDIANA.

ROAD-GATE.

SPECIFICATION forming part of Letters Patent No. 408,697, dated August 13, 1889.

Application filed June 22, 1889. Serial No. 315,180. (No model.)

*To all whom it may concern:*

Be it known that I, THOMAS DOUP, Jr., a citizen of the United States, residing at Columbus, in the county of Bartholomew and State of Indiana, have invented a new and useful Improvement in Road-Gates, of which the following is a specification.

My invention relates to an improvement in road-gates.

The object of my improvement is to provide means whereby the gate-latch may be raised and the gate given a positive swinging movement by a mounted rider, all as hereinafter fully described.

The accompanying drawings illustrate my invention.

Figure 1 represents a side elevation of the gate when closed. Fig. 2 represents a vertical section at $a$, Fig. 1.

A is the gate, which may be of ordinary construction. The gate is provided with a latch-bar B, which is pivoted at $b$ to the hinged edge of the gate and projects beyond the free edge of the gate, so as to engage a double catch on the post C.

D is a heavy fixed post, to which the gate is hinged by ordinary pivot-hinges $e$ and $f$.

G is a small shaft mounted in bearings secured to the top of the gate and having secured thereon, so as to turn therewith, a segment-wheel $h$ and a cogged pinion $i$. Segment-wheel $h$ is provided with a pair of arms $j$ and $k$, which project downward on each side of the top rail $l$ of the gate in such a manner that they stand clear of the bar $a$ short distance on each side, and when shaft G is turned the arms will be intercepted in their rotation by the bar, as hereinafter explained. Arms $j$ and $k$ are connected with the latch-bar B by a cord $u$, which passes over and is secured to wheel $h$.

M is a vertical shaft mounted on a support projecting from the post D and arranged in line with the pivots of hinges $e$ and $f$.

N is a shaft mounted on suitable bearings secured to the top of post D and carrying a gear-wheel $o$ on its inner end and a double sheave-pulley $p$ on its outer end.

Q is a crown gear-wheel mounted so as to turn loosely on shaft M, and arranged to engage the pinion $i$ and the gear-wheel $o$.

At the distance of the length of the gate, on each side of post D, along the roadway, I erect a post like that shown at R, on which is an arm $s$, projecting over the roadway, and a catch $v$ for the latch-bar. Cords $t$ and $x$, being passed around pulley $p$ in opposite directions, are carried to the posts R, and along their arms $s$, on each side of the gate, the cords being each provided with a weight $w$ to keep it taut.

The operation of the gate is as follows: The gate being closed, as in Fig. 1, a rider approaching the gate from the direction of post R, in Fig. 2, pulls upon cord $t$, thus rotating pulley $p$, shaft N, and gear-wheel $o$ in the direction indicated by the curved arrow, and rotating crown-wheel Q in the direction indicated by the straight arrow. The first effect of the rotation of crown-wheel Q is to rotate pinion $i$, shaft G, and segment-wheel $h$ until its rotation is stopped by arm $j$ coming in contact with the top rail of the gate. The opposite arm $k$ has by this movement been raised, thus raising the latch-bar by means of the cord $u$. The further rotation of pinion $i$ being prevented by the interception of arm $j$, and the gate being now unlatched, the further rotation of the crown-wheel Q, by means of the cord $t$, pulley $p$, shaft N, and gear-wheel $o$, operates to swing the gate away from the operator in the direction of the straight arrow until the gate strikes the opposite post R (not shown) on the other side. The operator, having passed through the gateway and clear of the gate, pulls the cord $x$ and reverses the movements of the parts above described, thus closing the gate.

It will be observed that the gate is swung by a positive movement of the gearing, thus rendering its operation independent of the force of gravitation and insuring its operation against the wind.

I claim as my invention—

1. The combination, with the post D and the gate hinged thereto and having a latch-bar, of the shaft G, mounted in bearings on the gate, segment-wheel $h$, having arms $k$ and $j$, and secured to said shaft, cord $u$, connecting the arms to the latch-bar, shaft N, mounted in bearings on the post and having pulley $p$ secured thereto, a cord attached to the periphery of the pulley, and intermediate connecting mechanism connecting shafts N and G, whereby the latch-bar is raised by the rotation of the shafts, substantially as specified.

2. The combination of the gate-post, the gate hinged thereto and having the latch-bar, the shaft mounted in bearings on the gate and carrying the pinion, and the segment-wheel having a pair of arms which embrace loosely the top edge of the gate, the cord connecting said arms with the latch-bar, the horizontal shaft mounted in bearings on the post and carrying the gear-wheel and the pulley, the cords attached to the periphery of the pulley, the vertical shaft mounted on the post, and the crown-wheel mounted on the vertical shaft and arranged to engage the gear-wheel and the pinion, all combined and arranged to co-operate as specified, whereby the latch is first raised and the gate then swung on its hinges, as set forth.

THOMAS DOUP, JR.

Witnesses:
   THOS. D. LONG,
   URIAH W. BREEDEN.